United States Patent [19]

LaSpisa

[11] 4,107,246
[45] Aug. 15, 1978

[54] EXTRUSION CONTROL

[75] Inventor: Ronald J. LaSpisa, Bartlesville, Okla.

[73] Assignee: Phillips Petroleum Company, Bartlesville, Okla.

[21] Appl. No.: 751,860

[22] Filed: Dec. 20, 1976

[51] Int. Cl.² ............................................. B29F 3/06
[52] U.S. Cl. .................................. 264/40.7; 425/145
[58] Field of Search ............... 264/40.7; 425/145, 146

[56] References Cited

U.S. PATENT DOCUMENTS

| 3,025,568 | 3/1962 | Hardy | 425/145 |
|---|---|---|---|
| 3,642,404 | 2/1972 | Nagawa | 425/145 |
| 3,728,056 | 4/1973 | Theysohn | 425/145 X |
| 3,861,841 | 1/1975 | Hanning | 425/146 |
| 3,933,155 | 1/1976 | Johnston | 425/145 X |

*Primary Examiner*—Robert L. Spicer, Jr.

[57] ABSTRACT

In an extrusion system wherein a single source of molten extrudable material is utilized to provide feed to a plurality of extrusion lines, the rate of flow of extrudable material from the source thereof to the plurality of extrusion lines is controlled to provide a preselected total product output rate. The position of a flow control valve means associated with each extrusion line is controlled to maintain a preselected material supply pressure upstream of said plurality of extrusion lines and to provide a preselected relationship among the measured production rates of said plurality of extrusion lines. In a preferred embodiment, an extrusion system having two extrusion lines supplied by a single source of molten extrudable material is controlled to provide a preselected total production rate, a preselected molten material source pressure, and a preselected balance between the extrusion rates of the two extrusion lines.

23 Claims, 6 Drawing Figures

EXTRUSION CONTROL

This invention relates to control of an extrusion process. Another aspect of the invention relates to control of an extrusion process wherein a single source of molten extrudable material supplies a plurality of extrusion lines. In still another aspect the invention relates to the operation of an extruder means having a plurality of output extrusion dies to provide stable extrusion process operation. In yet another aspect the invention relates to the control of a process wherein a single source of flowable material provides such material to a plurality of material streams. In another aspect the invention relates to balance control of two or more extrusion lines supplied by a single source of molten extrudable material.

In the production of extruded products, such as those extruded from molten thermoplastic material, for example, the extrusion process is often necessarily carried out at relatively high temperatures and pressures using equipment which is, in general, relatively bulky, heavy, and expensive. It is therefore desirable to make the most efficient possible use of those portions of the extrusion equipment which provide molten extrudable material at relatively high temperatures to an extrusion die at the end of an extrusion line. While various attempts have been made to obtain the maximum potential from that equipment supplying molten extrudable material by placing such a material supply means in communication with a plurality of extrusion lines, each of which is equipped with an extrusion die or other appropriate means for producing a desired extruding product, the operation of such systems has heretofore been fundamentally unstable with resulting fluctuation in balance between or among the production rates of the extrusion lines supplied accompanied by undesirable variations in product quality or departures from desired product specifications.

Accordingly, an object of this invention is to provide control of an extrusion process wherein a single source of molten extrudable material supplies a plurality of extrusion lines. Still another object of the invention is to provide stable operation of an extruder means having a plurality of output extrusion dies associated therewith. Yet another object of the invention is to provide control of a process wherein a single source of flowable material provides such material to a plurality of material streams. Another object of the invention is to provide balance control of two or more extrusion lines supplied by a single source of molten extrudable material.

In accordance with the invention a method and apparatus are provided whereby the total production rate from a single source of molten extrudable material supplied to a plurality of extrusion lines is maintained at a preselected value, the pressure of the molten extrudable materials applied by such a source to the various extrusion lines associated therewith is maintained at a preselected value, and a preselected relationship among the product output rates of the supplied extrusion lines is maintained. In order to ascertain the individual production rates of the supplied extrusion lines, the production rate of each extrusion line is measured by suitable means to produce an individual production rate signal representative of the rate of production for each extrusion line. In addition, the pressure of the material provided by the source of molten extrudable material to the extrusion lines is monitored. The molten material delivery rate of the material supply means is controlled to provide a preselected total extrusion rate as represented by the combination of the individual extrusion rate signals. In order to provide both the desired balance among the production rates of the extrusion lines and to maintain the desired delivery pressure to the extrusion lines, the position of a flow restriction valve means located within each extrusion line is controlled in response to an adjusted valve position set point signal which is generated in response to a preliminary valve position set point signal, representative of the valve position required to maintain the preselected delivery pressure of molten material, with a valve control set point adjustment signal, representative of the change in valve position required to maintain a desired preselected relationship among the production rates of the extrusion lines.

In a preferred embodiment of the invention there are produced, in response to the measured pressure at which molten extrudable material is delivered to the extrusion lines, a set of preliminary valve position set point signals which represent the positions of their respective associated valve means required to provide both a total resistance to flow required to maintain the preselected delivery pressure as well as to provide a preselected flow distribution among the extrusion lines. In this way, a fluctuation in delivery pressure will result in the adjustment of all flow control valves to increase or decrease their resistance to flow without substantial interference in the proportion of flow through the extrusion lines. In addition, valve position set point adjustment signals are preferably generated in response to comparison of the measured rates of production by the individual extrusion lines, as represented by the individual extrusion rate signals, to insure that preselected relationships among the production rates of the extrusion lines are maintained without altering the overall resistance to flow presented by the flow control valve means. Such a control system provides uncoupled or non-interactive control of total extruder system output, balance among individual extrusion line outputs, and maintenance of a desired delivery pressure to the individual extrusion lines in order to insure that each extrusion line produces a product having uniform characteristics and specifications.

Additional objects and advantages of the invention will be apparent from the following additional description of the invention and from the appended claims thereto as well as from a description of the preferred embodiment of the invention illustrated by the drawings in which:

Although the method and apparatus of the invention are applicable to extrusion systems in which two or more extrusion lines are supplied by a single source of molten extrudable material, the nature of many commercial extrusion processes is such that, with the type, temperature, pressure, and other characteristics of the common extrudable material source being the same, the invention is particularly applicable to systems in which each extrusion line produces substantially the same size and type of extruded product. While the invention can be implemented by those skilled in the art to control processes in which the product sizes, extrusion rates, and other characteristics of production associated with each of the individual extrusion lines can be different, the presently preferred embodiment of the invention is one in which the molten extrudable material is divided substantially equally among the plurality of extrusion lines, each producing a product of substantially the same shape and specification at substantially the same extrusion rate. Such a system is particularly adaptable to the production of, for example, hollow conduit extruded from a thermoplastic polymer or resin. In a particularly preferred embodiment, there are two extrusion lines supplied by a single source of molten extrudable material.

Figure 1:
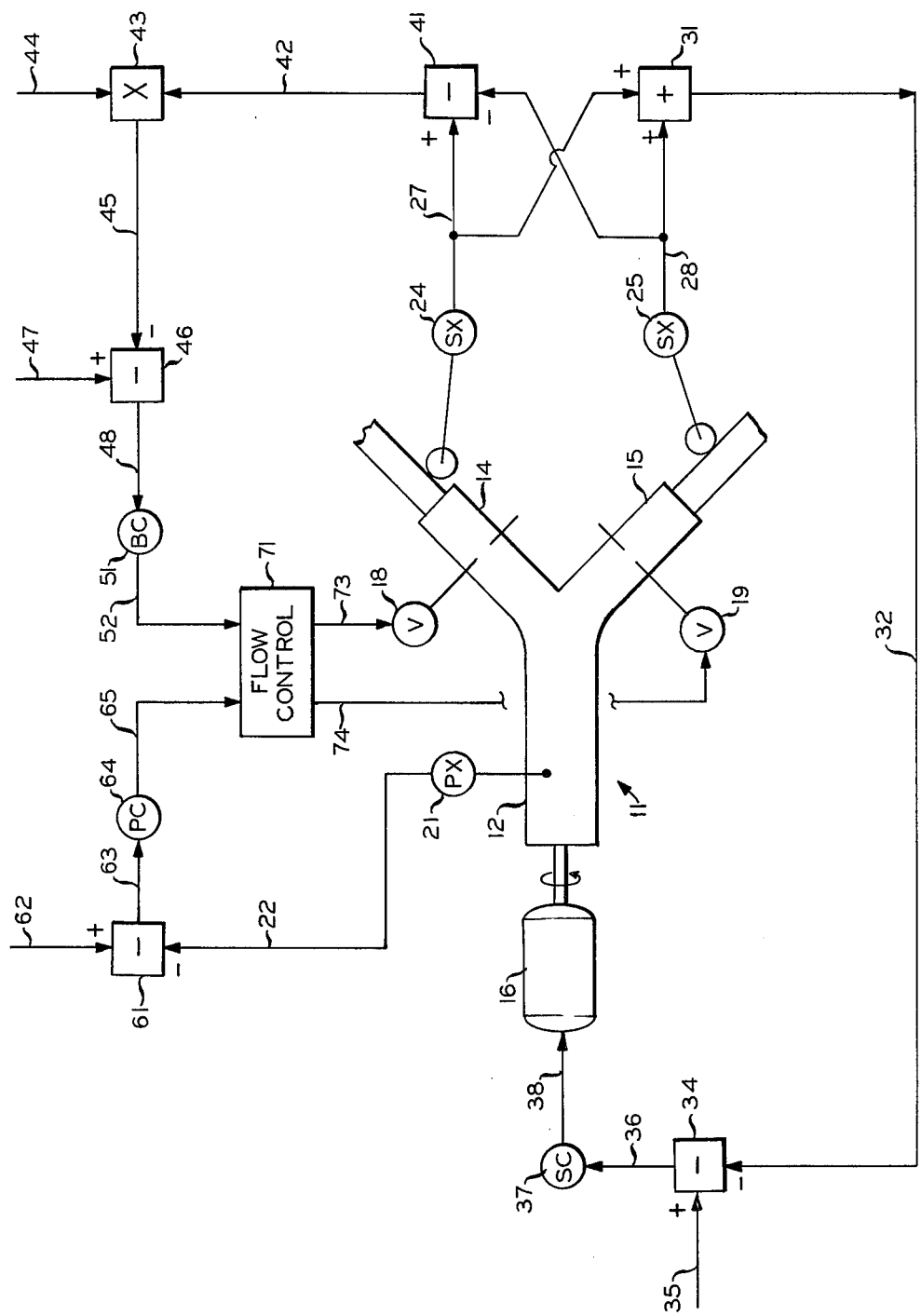
FIG. 1 is a schematic representation of an extrusion process operated in accordance with the invention.

Referring to FIG. 1, there is schematically illustrated an extrusion process of the particularly preferred type wherein an extrusion means 11 comprises an upstream source of molten extrudable material 12 and downstream extrusion lines 14 and 15. The source of molten extrudable material 12 can be any suitable means such as a screw extruder or dynamic extruder which is supplied with a source of polymer or other extrudable material (not shown) and driven by a motor 16 or other suitable drive means. A valve means 18, 19 having suitable valve actuating means associated therewith is provided for each of the extrusion lines 14, 15 for altering the resistance to flow through the respective extrusion line with which it is associated. A pressure transducing means 21 is adapted for delivering a supply pressure signal 22 responsive to and representative of the pressure of molten extrudable material at a suitable preselected location within the material supply portion 12 of the extruding apparatus 11. A speed transducing means 24, 25 is associated with each extrusion line 14, 15 for providing an individual extrusion rate signal 27, 28 representative of the production rate through the associated extrusion line or, in other terms, the rate at which molten extrudable polymer from the material source 12 is being delivered through the respective extrusion line as an extruded product. To the extent that the products of the extrusion lines may be of different size, shape or otherwise have characteristics which would require scaling or other modification of a measured lineal rate of product extrusion or other similar measured or monitored production rate characteristics, incorporation of scaling factors, modifications of sensing devices, or other similar modifications are preferably utilized to provide individual extrusion rate signals 27, 28 which are representative of the amount of polymer produced as product by the respective extrusion line. In addition the transducing means 24 and 25 may also incorporate additional scaling factors required to produce a signal which is compatible with other equipment used in the control system.

With the individual production rate signals 27, 28 being representative of the rate at which material is being converted to extruded product by the associated extrusion lines 14, 15, combination of the individual extrusion rate signals 27, 28, using suitable means such as an adding means 31, can be utilized to provide a total extrusion rate signal 32 representative of the total rate of extrusion of material through all extrusion lines. A comparator means 34 accepts the total extrusion rate set point signal 32 and a preselected extrusion rate set point signal 35 representative of a preselected desired total extrusion rate and delivers a total extrusion rate error signal 36 representative of the difference between the total extrusion rate set point signal 35 and the total extrusion rate signal 32. A speed controller means 37 produces a motor speed control signal 38 in response to the error signal 36. The characteristics of the speed controller means 37 are preferably such that the controller is capable of proportional-integral or proportional-integral-derivative control, even though all characteristics of the controller may not be necessary in each individual control application, wherein no corrective change in the steady state characteristics of the speed control signal 38 will be initiated when the error signal 36 is zero. The speed controller means 37 therefore operates to provide a total extrusion rate through both extrusion lines 14 and 15, as represented by the total extrusion rate signal 32, at a value represented by the total extrusion rate set point signal 35.

In a system such as one illustrated by FIG. 1 in which there are two extrusion lines 14, 15, each preferably accepting one-half the molten extrudable material from the material source means 12, the error in balance between the two extrusion lines can be determined by a comparison of the individual extrusion rate signals 27 and 28 utilizing a subtraction means or comparator means 41 to produce a balance comparison signal 42 containing information from which the error in balance between the extrusion rates in the two extrusion lines can be determined. If necessary or desired, the balance error signal 42 can have applied thereto, by any suitable means such as by a multiplication means 43, a correction factor 44 which may be desirable to provide appropriate scaling or correction thereof. For example, in the system illustrated by FIG. 1 the balance error signal 42 will, in general, be twice the magnitude of the error of each of the individual extrusion rate signals 27 and 28 from their desired values. By applying a scaling factor of one-half as the scaling factor signal 44 the corrected balance error signal 45 will be representative of the amount by which each individual extrusion rate signal 27, 28 differs from its desired value. In appropriate cases the correction factor signal 44 can, of course, be representative of a multiplication factor of 1.0 or the multiplication or scaling means 43 can be omitted.

The existing relationship between the individual extrusion rate signals 27 and 28 represented by the signal 45 is provided to a comparator means 46 which produces an output signal 48 representative of the difference between the signal 45, representing the measured relationship between the individual extrusion rates of the extrusion lines 14 and 15, and a set point signal 47, representative of the desired relationship between the individual extrusion rate signals 27 and 28. In the system of FIG. 1 wherein equality of extrusion rates through the extrusion lines 14 and 15 is desired, the set point signal 47 will preferably be zero. A balance controller means 51 which can be any suitable controller means, preferably a proportional-integral or proportional-integral-derivative controller means, delivers a balance control signal 52 in response to the error signal 48. The balance control signal 52 delivered by the balance control means 51 will be representative of the change in position of one of the control valve means 18 or 19 required to achieve the desired balance between the individual extrusion rate signals 27 and 28. In a system involving only two extrusion lines, one balance control signal 52 will be sufficient to define the valve position change required for both valve means 18 and 19 since, in general, equal incremental changes in opposite directions will normally be required to correct errors in balance between the two extrusion rates. For systems having additional extrusion lines, generation of additional balance control signals will be required.

A comparator means 61 accepts the pressure signal 22 and a pressure set point signal 62, representative of the desired pressure within the material supply means 12, and delivers in response to comparison of the two signals a pressure error signal 63. A pressure controller means 64 accepts the pressure error signal 63 and delivers in response thereto a pressure control signal 65. The pressure controller means 64 is preferably of the proportional-integral or proportional-integral-derivative type but can be any suitable control means for implementing an appropriate control relationship in the generation of the pressure control signal 65. A flow control means 71 accepts the balance control signal 52 and pressure control signal 65 and delivers in response thereto a valve position control signal 73, 74 associated with each respective control valve means 18, 19. The characteristics of the flow control means 71 are preferably such that the balance control signal 52 is utilized to initiate alteration of the respective positions of valve means 18 and 19 to achieve the desired balance relationship between the individual extrusion rate signals 27 and 28 without altering the total resistance to flow presented by the combination of valve means 18 and 19. Similarly, the response of the flow control means 71 to the pressure control signal 65 preferably provides for positioning of the valve means 18 and 19 to present a combined resistance to flow necessary for maintaining the pressure signal 22 at a value equal to the pressure set point signal 62 without altering the proportional relationship between the individual extrusion rate signals 27 and 28. In such a system of uncoupled or non-interactive control, alteration of the balance control signal 52 within the range of conditions ordinarily encountered in control applications will not have a substantial effect on the delivery pressure of the material source 12 as represented by the pressure signal 22, and alteration of the pressure control signal 65 under ordinary control conditions will not have a substantial effect on the relationship between the individual extrusion rate signals 27 and 28.

Figure 2:
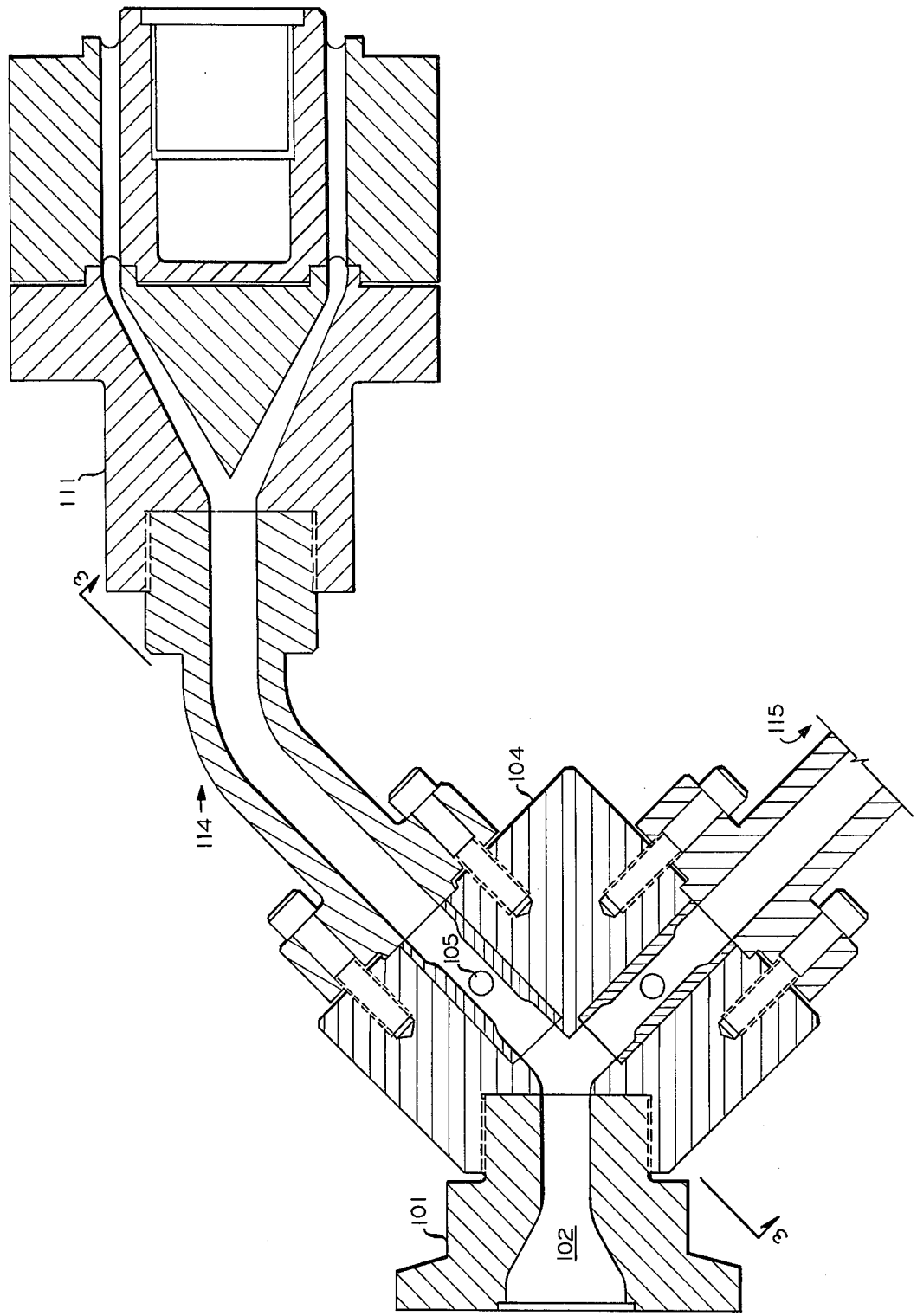
FIG. 2 is a schematic representation, in cross section, of a portion of the extrusion apparatus which can be used in conjunction with the invention.

FIG. 2 is a schematic cross sectional representation of a portion of an extrusion apparatus with which the control system of the invention can be utilized. An outlet adaptor means 101 defining a single central passageway 102 is provided to accept the output flow of a conventional extrusion apparatus and, as necessary, to adapt the outlet conduit size of the means for providing a supply of molten extrudable material to a size compatible with downstream equipment. The downstream opening of the passageway 102 communicates with the inlet of a Y-shaped passageway defined by a stream splitting means 104. Each downstream leg of the Y conduit formed by the splitting means 104 is provided with a necked-down passageway portion having associated therewith an opening 105 or other suitable means for introducing a flow restrictive device into the necked-down passageway portion. The downstream opening of each leg of the Y passageway within the splitting means 104 is in operable fluid communication with an extrusion line 114, 115 which terminates in an extrusion die means 111.

Figure 3:
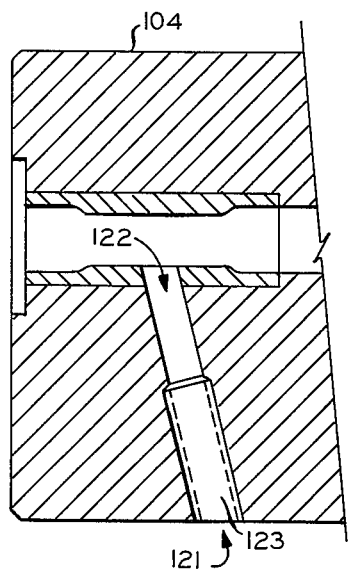
FIG. 3 is a partial cross section of the apparatus of FIG. 2 viewed along line 3—3 of FIG. 2.
Figure 4:
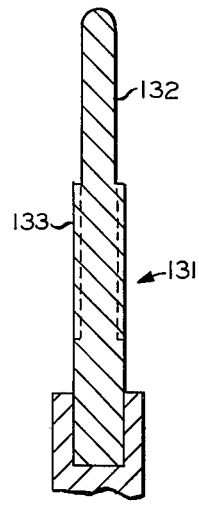
FIG. 4 is a cross sectional view of a portion of a flow control valve means which can be used in implementing the invention.

The preferred construction of the valve means associated with each extrusion line 114, 115 is illustrated by FIGS. 3 and 4. Within each downstream leg of the splitting means 104 and at the necked-down portion thereof there is provided an opening 121 which is generally cylindrical in shape and which has a first unthreaded portion 122 and a second threaded portion 123. A flow restriction element 131 (FIG. 4) is sized to provide a first portion 132 mateable with the unthreaded portion 122 of the opening 121 and a second portion 133 which is threaded and is capable of a suitable mating engagement with the threaded portion 123 of the opening 121. When inserted into the opening 121 and threadably engaged therein, the flow restriction element 131 can be further inserted or withdrawn into the necked-down passageway of the splitting means 104 by suitable rotation of the flow restriction element 131 around its elongated axis. Rotation of the element 131 in a first direction can therefore be used to introduce the element further into the necked-down portion of the passageway to increase resistance to flow and rotation in the opposite direction can be similarly used to decrease resistance to flow. The first end portion 132 of the flow restriction element 131 is preferably sized to prohibit complete closure of the passageway through the splitting means 104. By preventing complete closure of either of the downstream legs of the Y passageway, complete cessation of flow through either extrusion line is avoided and inadvertent simultaneous closure of both passageways resulting in equipment damage is prevented. The maximum degree of flow restriction required or desired in any particular system will be determined by the maximum degree of restriction required to provide the necessary or desired breadth of control range.

Figure 5:
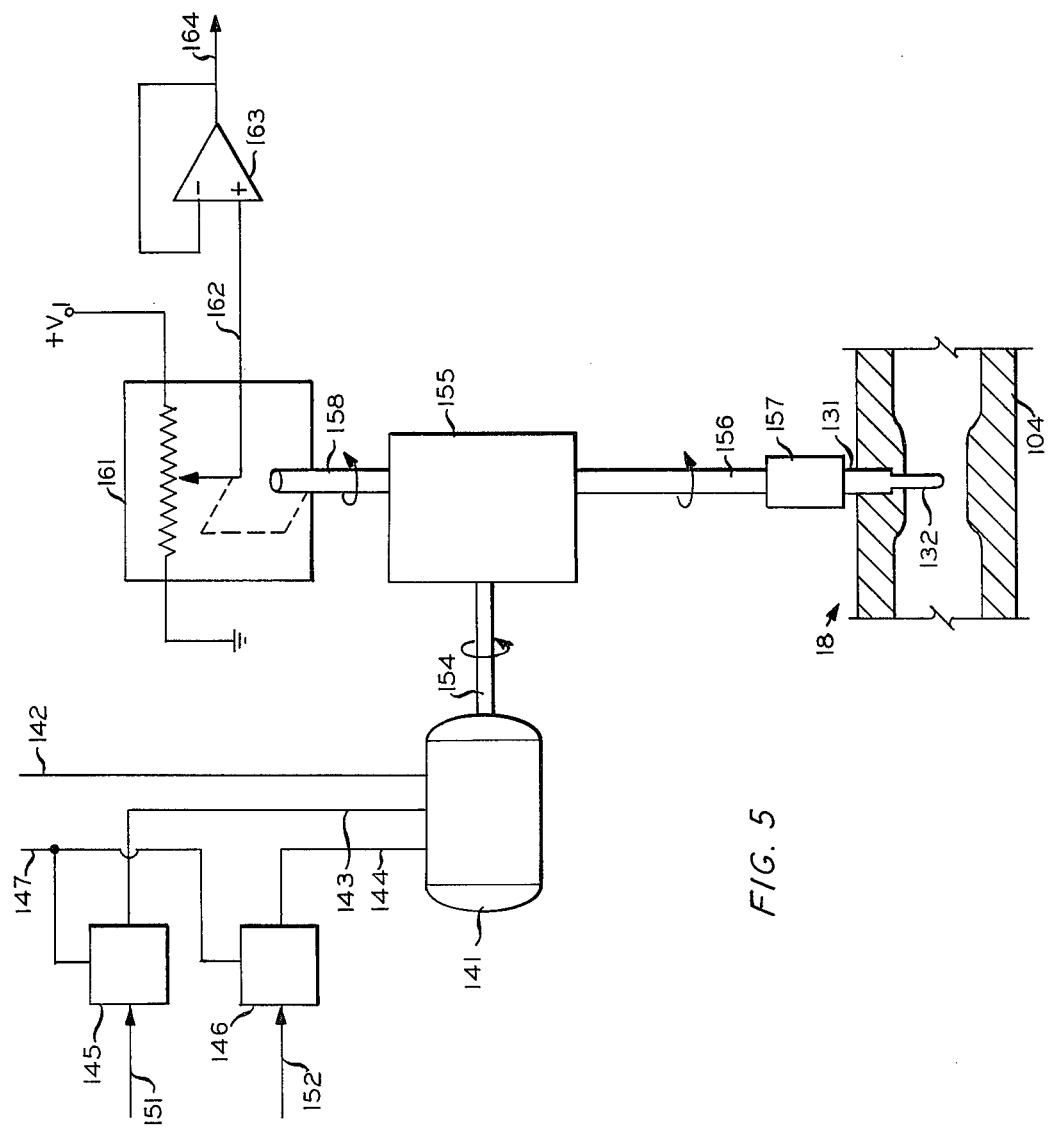
FIG. 5 is a schematic illustration of a preferred implementation of servomotor control of the valve means of FIGS. 3 and 4.

Operation of the flow restriction valves is schematically illustrated by FIG. 5. A reversible motor 141 is provided with actuating electrical power from any standard power source through a common power inlet line 142 and one of a forward power line 143 or a reverse power line 144. Determination of forward or reverse direction results from application of a digital actuating signal to either a forward actuating relay 145 or a reverse actuating relay 146. For example, when a digital actuating signal 151 representative of a logic 1 is applied to the forward actuating relay 145, power is applied from power source lines 147 and 142 to the common and forward actuating terminals of the motor 141. Similarly, when a digital actuating signal 152 representative of a logic 1 is applied to the reverse actuating relay 146 power is applied to the reverse actuating terminal of the motor 141 to drive the motor in the reverse direction. The motor 141 is connected by any suitable means such as a drive shaft 154 to a reduction gear means 155 or other suitable means for imparting rotational movement of appropriate speed and power to the flow restriction element 131. In the typical schematic illustration of FIG. 5, the flow restricting element 131 is driven by a shaft 156 having a suitable coupling means 157 associated therewith. Coupled with the shaft 156, either directly or by a fixed predetermined geared relationship or other similar fixed relationship, is a shaft 158 operably connected to a potentiometer means 161. The potentiometer means 161 has a resistance connected between a suitable voltage source and ground with a sweep terminal 162 mechanically coupled to the shaft 158. As the shafts 156 and 158 rotate in the adjustment of the flow restriction element 131 the voltage seen at the sweep terminal 162 of the potentiometer means 161 is therefore representative of the relative position of the first portion 132 of the flow restriction element 131 within the necked-down portion of the splitting means 104. The voltage applied to the sweep terminal 162 of the potentiometer 161 through the voltage dividing action of the resistor associated therewith is applied to the non-inverting input of an operational amplifier means 163. The operational amplifier means 163 is connected to form a unity gain buffer amplifier with the inverting input and output thereof connected to each other so that a valve position feedback signal 164 equal to the voltage seen at the sweep terminal 162 of the potentiometer 161 can be provided in suitable form for use as required in the generation of the relay actuating signals 151 and 152, as will be seen from the description of FIG. 6.

Figure 6:
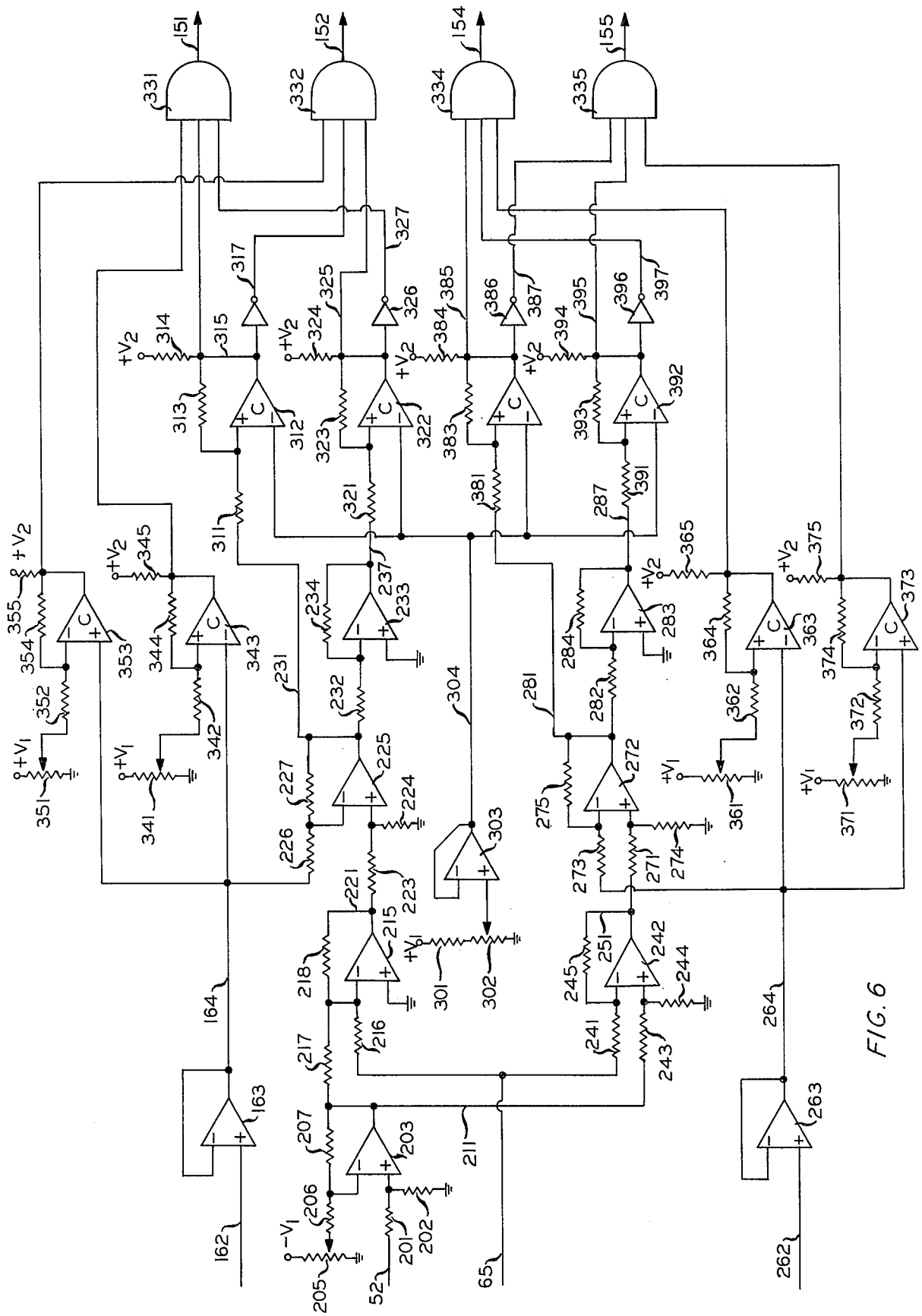
FIG. 6 is a detailed electrical schematic diagram of the preferred flow control means of FIG. 1.

A detailed electronic circuit suitable for generation of valve control signals for use in the particularly preferred embodiment of the invention illustrated by FIG. 1 is presented in FIG. 6. The balance controller output signal 52 is applied through a resistor 201 to the non-inverting terminal of an operational amplifier 203. The non-inverting input terminal of the amplifier 203 is also connected to ground through a resistor 202. A potentiometer 205 connected between a voltage source $-V_1$ and ground has its sweep terminal connected through a resistor 206 to the inverting input of the operational amplifier 203. The inverting input of the amplifier 203 is also connected through a resistor 207 to the output thereof. The output signal from the operational amplifier 203 will be a control valve set point adjustment signal 211 representative of the correction in the position of the valve means 18 which must be implemented in order to provide a desired relationship between the relative extrusion rates of the two extrusion lines. The effect of the potentiometer 205 is to effectively add to the balance control output signal 52 a positive bias signal (accomplished by subtraction of a negative bias signal) required to maintain the control valve set point adjustment signal 211 at a value of zero when no adjustment is required. Although such bias signal addition might not be necessary in some control situations, many process controllers, such as the preferred balance controller means 51, deliver an output signal having a range of from, for example, $-10$ to 0 volts. Since it is desirable to maintain the normal steady state operating value of such control elements somewhere in the neighborhood of the middle of their possible control range, in the preferred system the balance controller means 51 of FIG. 1 is provided with an internal bias which provides an output signal 52 of $-5$ volts when the error signal 48 is equal to zero. The circuit of the operational amplifier 203 would therefore add 5 volts to the signal 52 in order to place the output signal 52 of the balance controller means 51 into a format wherein a control valve set point adjustment signal of zero is represented by an electrical zero or grounded signal.

Although in some systems it may be desirable to alter the format of the pressure control signal 65 in order to convert it to a preliminary valve position set point signal, in the preferred embodiment illustrated the scaling factors pnecessary to provide a preliminary valve position set point signal representative of a valve position required to maintain the pressure signal 22 at a predetermined value have been incorporated into the pressure control signal 65 by selection and tuning of the transfer characteristic of the pressure controller means 64. Since the preferred relationship between the extrusion rate of the two extrusion lines is substantial equality, the preliminary valve position set point signals for the two extrusion lines will also be equal to each other and, due to the scaling incorporated into the generation of the pressure control signal 65 as previously discussed, will both be equal to the pressure control output signal 65. In a similar manner, because the desired relationship between the flow rates through the two extrusion lines is substantially equality, the valve position set point adjustment signals for the two extrusion lines will be of substantially equal magnitude and opposite sign.

An operational amplifier 215 has the non-inverting input thereof connected to ground with signals 65 and 211 applied to the inverting inputs thereof through resistors 216 and 217 respectively. The output terminal of the amplifier 215 is connected through a feedback resistor 218 to the inverting input thereof to provide effective algebraic addition of the appropriate preliminary valve position set point signal and valve position set point adjustment signal to produce an adjusted valve position set point signal 221.

The adjusted valve position set point signal 221 is applied through a resistor 223 to the non-inverting input of an operational amplifier 225. The non-inverting input terminal of the amplifier 225 is also connected through a resistor 224 to ground. The valve position feedback signal 164 (FIG. 5) is applied to the inverting input of the amplifier 225 through a resistor 226, and the output of the amplifier 225 is connected to the inverting input terminal thereof through a feedback resistor 227. The circuit of the amplifier 225 provides effective algebraic subtraction of the valve position feedback signal 164 from the adjusted valve position set point signal 221 to provide a valve position error signal 231 representative of the error between the actual measured valve position represented by the feedback signal 164 and the desired valve position represented by the adjusted position set point signal 221. The error signal 231 is applied to the inverting input of an amplifier 233 through a resistor 232. The non-inverting input terminal of the amplifier 233 is connected to ground and the output thereof is connected through a feedback resistor 234 to the inverting input thereof to provide an amplifier output signal 237. The resistors 232 and 234 are preferably of substantially equal value in order to provide an amplifier output signal 237 which is of the same magnitude but of opposite sign as the error signal 231.

In a similar manner, for the valve means 19, signal 65 is applied to the inverting input terminal of an operational amplifier 242 through a resistor 241 with signal 211 being applied to the non-inverting input thereof through a resistor 243. The non-inverting input terminal of the amplifier 242 is connected through a resistor 244 to ground and the output of the amplifier is connected to the inverting input thereof through a feedback resistor 245. The signal 251 appearing at the output of the amplifier 242 is therefore representative of the algebraic subtraction of signals 65 and 211 or, in other terms, representative of the algebraic addition of a preliminary valve position set point signal, equal to the preliminary valve position set point signal for valve means 18, added to a valve position set point adjustment signal of equal magnitude and opposite sign of the corresponding adjustment signal associated with the valve means 18. The signal 251 therefore represents the adjusted valve position set point signal for the valve means 19.

In a manner analogous to the generation of the valve position feedback signal 164 for valve means 18, a potentiometer voltage 262 applied to a unit gain buffer amplifier 263 is utilized to provide a valve position feedback signal 264 for the valve means 19. The adjusted valve position set point signal 251 is applied through a resistor 271 to the non-inverting input of an operational amplifier 272 and the valve position feedback signal 264 is applied to the inverting input terminal of the amplifier 272 through a resistor 273. The output signal of the amplifier 272, having its non-inverting input connected to a resistor 274 to ground and its inverting input connected to its output through a feedback resistor 275, provides an output signal 281 representative of the valve position error or algebraic difference between the valve position set point signal and valve position feedback signal for the valve means 19.

The valve position error signal 281 is applied to the inverting input of an amplifier 283 through a resistor 282. The inverting input of the amplifier 283 is connected to the output terminal thereof through a feedback resistor 284. With the resistors 282 and 284 being substantially equal, therefore, the output signal 287 of the amplifier 283 will be of the same magnitude and of opposite sign as the error signal 281.

A voltage divider resistor network having a resistor 301 and potentiometer resistor 302 in series between a preselected positive voltage source and ground provides a voltage signal through the sweep terminal of the potentiometer 302 to the non-inverting input of a unit gain buffer amplifier 303 to produce a dead-band range signal 304. The signal 304 is preferably as near as feasible to 0 or ground consistent, of course, with the process and equipment limitations encountered in any particular application of the control system. The error signals 231 and 281 and the inverted error signals 237 and 287 are converted into digital signals which can be used to implement actuation of valve control motors in the forward or reverse direction as appropriate. Error signal 231 is provided through a resistor 311 to the positive terminal of a comparator 312. The output of the comparator 312 is connected through a large resistor 313 to the positive input thereof and is also connected through a resistor 314 to a positive voltage source $V_2$ representative of a digital logic 1. The dead-band selection signal 304 is provided to the negative input terminal of the comparator 312. The comparator 312 therefore produces an output signal 315 which is a logic 1 when the error signal 231 is both positive and larger than the dead-band signal 304 and at all other times produces an output signal 315 which is a logic 0. A digital inverting means 316 produces an output signal 317 which is always the binary opposite of the signal 315.

In a similar manner the inverted error signal 237 is applied through a resistor 321 to the positive terminal of a comparator 322 having resistors 323 and 324 associated therewith in the same relationship as resistors 313 and 314 of comparator 312. The digital output signal 325 of the comparator 322 is therefore a digital 1 whenever the inverted error signal 237 is a positive signal greater than the dead-band signal 304 and is a logic 0 at all other times. A digital inverter 326 delivers a signal 327 which is always the logic opposite of signal 325. The combination of comparators 312 and 322 provides a signal 315 as an enabling digital logic 1 to an AND circuit 331 whenever the error signal 231 is positive and is greater than the magnitude of signal 304 above 0. Similarly, the output signal 325 of the comparator 322 provides an enabling digital logic 1 to an AND circuit 332 whenever the set point signal 231 is negative and is at least the magnitude of signal 304 below zero. When the magnitude of the error signal 231 is less than the magnitude of the dead-band selection signal 304, both comparators 312 and 322 will provide respective output signals 315 and 325 which are logic 0's.

In order to prevent control system operation beyond the desired or effective position ranges of the flow control valve 18, an open position limit set point signal is provided by the setting of a potentiometer 341 and applied through a resistor 342 to the positive terminal of a comparator 343. The output terminal of the comparator 343 to the AND circuit 331 is connected through a large resistor 344 to the positive input terminal thereof and is connected through a resistor 345 to a positive voltage source $V_2$ representative of a logic 1. When the measured valve position represented by the valve position feedback signal 164 is below the open limit set point delivered by the potentiometer 341, an enabling logic 1 is provided as an output of the comparator 343. If, however, the valve position feedback signal 164 should indicate a valve position in excess of the open limit setting of the potentiometer 341, the output of the comparator 343 becomes a logic 0 and inhibits generation of a signal 151 by the AND circuit 331 which could advance the valve to a further open position. In a similar manner, a potentiometer 351 delivers a close limit set point signal through a resistor 352 to the negative input terminal of a comparator 353 having resistors 354 and 355 inserted between the negative input terminal and output terminal serving in the same relative capacities as the analogous resistors 344 and 345 associated with the comparator 343. The valve position feedback signal 164 is applied to the positive terminal so that a logic 1 output of the comparator 353 is delivered as an enabling input signal to the AND circuit 332 when the feedback position signal 164 is above the close limit set point setting of the potentiometer 351. If the valve position feedback signal 164 indicates a valve position less than the close limit setting of the potentiometer 351, the output of the comparator 353 becomes a logic 0 and inhibits generation of a signal 152 by the AND circuit 332 which could further close the valve.

In exactly the same manner a comparator 363 having associated therewith a potentiometer 361, resistor 362, resistor 364, and resistor 365 provides a logic 1 output signal whenever the valve position feedback signal 264 is less than the open limit signal represented by the setting of the potentiometer 361. In addition a comparator 373 having associated therewith a potentiometer 371 and resistors 372, 374 and 375 performs a function exactly analogous to the function of the comparator 353 by providing a logic 1 output whenever the valve position feedback signal 264 is greater than the close limit signal represented by the setting of the potentiometer 371.

A comparator 382 having associated therewith resistors 381, 383 and 384 and an inverter 386 produces an output signal 385 in the same manner that the output signal 315 is produced by the comparator means 312. In addition, a comparator 392 having associated therewith resistors 391, 393 and 394 and an inverter 396 produces signals 395 and 397 analogous to the signals 325 and 327 produced by the comparator 322.

From the foregoing it can be seen that for an error signal 231 greater than the dead band selection signal 304 and a valve position feedback signal less than the open limit signal represented by the position of the potentiometer 341, all the inputs to the AND circuit 331 will be in a logic 1. This causes signal 151 to be a logic 1 and the servomotor associated with the control valve 18 will be driven in a forward direction. Likewise, for a negative error signal 231 having a magnitude greater than the dead-band selection signal 304, when the valve position feedback signal 164 is not less than the close limit signal represented by the position of the potentiometer 351, all the inputs to the AND circuit 332 will be in the logic 1 state and the resulting logic 1 output signal 152 will cause the servomotor associated with the valve means 18 to be activated in a reverse direction. Signal 317 is provided as an input to the AND circuit 332 and signal 327 is provided as an input to the AND circuit 331 in order to positively preclude any possibility of signals 151 and 152 both being in a logic 1 state at the same time, a condition which could result in serious equipment damage.

In an exact analogous manner the AND circuit 334 produces a logic 1 output signal 154 when the error signal 281 is a positive signal of greater magnitude than the dead-band selection signal 304 and the valve feedback signal 264 is less than the open limit signal represented by the setting of the potentiometer 361; and the AND circuit 335 produces a logic 1 output signal 155 whenever the error signal 281 is a negative value of greater magnitude than the magnitude of the dead-band selection signal 304 and the valve position feedback signal 264 is greater than the close limit signal represented by the setting of the potentiometer 371. Signals 154 and 155 are then utilized in the same manner as respective signals 151 and 152 to appropriately increase or decrease the resistance to flow of the control valve means 19.

The control system of the invention can be implemented in any suitable manner utilizing any appropriate apparatus such as, for example, electrical analog, digital electronic, hydraulic, pneumatic, mechanical or other types of control means or various combinations of these and other control means and control using any suitable means can be practiced within the scope of the invention. In the particularly preferred embodiment described in detail hereinabove, the preferred implementation is in the form of a combination of electrical analog and digital electronic control signal generation apparatus working in conjunction with various mechanical and electromechanical control implementation means. Presently preferred apparatus suitable for use with the particularly preferred embodiment of the invention described hereinabove is as follows:

| | | |
|---|---|---|
| Speed transducers 24 and 25 | 60-A-05 Tachometer Wertronix Wertronix Corp., 2673 Culver Ave., Dayton, Ohio 45429 | |
| Adding means 31 | Electrical Analog adder equivalent to circuit of amplifier 215 of FIG. 6 Burr-Brown Research Corp., Tucson, Ariz. 85706 | |
| Comparator means 34,41,46 and 61 | Electrical analog subtractor equivalent to circuit of amplifier 225 of FIG. 6 Burr-Brown Research Corp., Tucson, Ariz. 85706 | |
| Multiplier means 43 | Multiplier-Divider - Burr-Brown Research Corp., Tucson, Ariz. 85706 | |
| Speed controller 37, balance controller 51, and pressure controller 64 | Controller Part No.B03979 Applied Automation, Inc. Bartlesville, Okla. 74003 | |
| Pressure transducer 21 | Rosemont Pressure Transmitter Model 1401A-302, Rosemont, Inc., P.O. Box 35129, Minneapolis, Minn. 55435 | |
| Servomotor 141 | Bodine Electric Co., 2500 W. Bradley Pl., Chicago, Ill. 60618 | |
| Digital actuated power relays 145 & 146 | W-6225DSX-1 Magnacraft, Magnacraft Mfg. Co., 6009 S. New England Ave., Chicago, Ill., 60638 | |
| Reduction gear 155 | No. FWC-321-600-H1 Boston Gear Rockwell International, Boston Gear Div., 3200 Main St., Quincy, Mass., 02171 | |
| Potentiometer 161 | Beckman Instruments, Inc., Helipot Div., 2500 Harbor Blvd., Fullerton, Calif. 92634 | |
| Operational amplifiers 163,203,215,225,233, 242,272,283 and 263 | Burr-Brown No. 558 Burr-Brown Research Corp., Tucson, Ariz. 85706 | |
| Comparators 312,322,343,353,363,373,382 and 392 | LM 319 National Semiconductor | National Semiconductor Corp., 2900 Semiconductor Drive Santa Clara, Calif., 95051 |
| Inverters 317,326,386 and 396 | 7404 National Semiconductor | |
| AND circuits 331,332,334 and 335 | N7411 National Semiconductor | |
| Potentiometers 205,341,351,361 and 371 | 10 kilohms | Beckman Instruments, Inc., Helipot Div., 2500 Harbor Blvd. Fullerton, Cal., 92634 |
| Potentiometer 302 | 100 ohms | |

| -continued | | |
|---|---|---|
| Resistors 201,202,206,207,216,217,218,223, 224,226,227,232,234,311,321,241,243,244, 245,271,273,275,282,284,381,391,342,352 362,372 and 301 | 10 kilohms | Dale Electronics,Inc. Norfolk, Nebraska 68701 |
| Resistors 313,323,344,354,364,374,383 and 393 | 2 megohms | |
| Resistors 314,324,345,355,365,375,384, and 394 | 3 kilohms | |

While the invention has been described in conjunction with the presently preferred embodiment thereof, reasonable variations and modifications by those skilled in the art are possible within the scope of the invention and of the appended claims thereof.

I claim:

1. A method for controlling an extrusion process wherein a plurality of extrusion lines are supplied by a common source of molten extrudable material, said method comprising:

establishing an individual extrusion rate signal associated with each said extrusion line and representative of the rate of extrusion therethrough;

controlling the rate of delivery of said molten material by said common source thereof to maintain the sum of said individual extrusion rate signals at a preselected value;

establishing a pressure signal representative of the pressure of molten material provided to said plurality of extrusion lines;

generating a preliminary valve position set point signal associated with each said extrusion line, said preliminary valve position set point signals being representative of the positions of respective flow control valves associated with each said extrusion line required to maintain said pressure signal at a preselected value;

establishing, in response to a comparison of two or more of said individual extrusion rate signals, a valve position set point adjustment signal associated with each said extrusion line, each said valve position set point adjustment signal being representative of the change in the position of the flow control valve associated therewith necessary to provide a preselected relationship among the individual extrusion rate signals;

combining the preliminary valve position set point signal and the valve position set point adjustment signal associated with each said extrusion line to produce a plurality of adjusted valve postion set point signals; and positioning the valve associated with each said extrusion line to provide a valve position represented by its respective adjusted valve position set point signal.

2. A method in accordance with claim 1 wherein said preliminary valve position set point signals are representative of respective flow control valve positions for implementing extrusion line extrusion rates having said preselected relationship to each other.

3. A method in accordance with claim 1 wherein said valve position set point adjustment signals are representative of respective flow control valve position changes required to maintain said preselected relationship among the extrusion rates of said plurality of extrusion lines without substantial alteration of the overall total resistance to flow of said plurality of flow control valves.

4. A method in accordance with claim 3 wherein said preliminary valve position set point signals are representative of respective flow control valve positions for implementing extrusion line extrusion rates bearing said preselected relationship to each other.

5. A method in accordance with claim 4 wherein all said preliminary valve position signals are substantially equal and wherein said preselected relationship comprises substantial equality among the extrusion rates represented by said individual extrusion rate signals.

6. A method in accordance with claim 4 wherein combining each said preliminary valve position set point signal with its associated valve position set point adjustment signal comprises summing each said preliminary valve position set point signal with its associated valve position set point adjustment signal and wherein positioning the associated valve comprises maintaining said associated adjusted valve position set point signal within a preselected range of a valve position feedback signal representative of the actual position of said associated valve.

7. A method in accordance with claim 1 wherein all said preliminary valve position set point signals are substantially equal and wherein said preselected relationship comprises substantial equality among the extrusion rates represented by said individual extrusion rate signals.

8. A method in accordance with claim 1 wherein said common source of molten extrudable material supplies two said extrusion lines and wherein said preliminary valve position set point signals are representative of flow control valve positions for implementing individual extrusion rates having a preselected proportional relationship to each other.

9. A method in accordance with claim 1 wherein said common source of molten extrudable material supplies two said extrusion lines and wherein said valve position set point adjustment signals are representative of respective flow control valve position changes required to maintain a preselected proportional relationship between the extrusion rates of said two extrusion lines without substantial alteration of the total resistance to flow through the combination of said two extrusion lines.

10. A method in accordance with claim 9 wherein said preliminary valve position set point signals are representative of flow control valve positions for implementing individual extrusion rates having said preselected proportional relationship to each other.

11. A method in accordance with claim 10 wherein both said preliminary valve position set point signals are substantially equal and wherein said preselected proportional relationship comprises substantial equality among the extrusion rates represented by said individual extrusion rate signals.

12. A method in accordance with claim 11 wherein the sum of said valve position set point adjustment signals is substantially zero.

13. A method in accordance with claim 12 wherein combining each said preliminary valve set point signal with its associated valve position set point adjustment signal comprises summing each said preliminary set point signal with its associated valve position set point adjustment signal and wherein positioning the associated valve comprises maintaining said associated adjusted valve position set point signal within a preselected range of a valve position feedback signal representative of the actual position of said associated valve.

14. Apparatus comprising:
   material supply means for providing a source of molten extrudable material under pressure to a plurality of extrusion lines, each said extrusion line being adapted to deliver a continuous extruded product therefrom;
   valve means associated with each said extrusion line for modifying the resistance to flow of said molten material therethrough;
   production rate measurement means associated with each said extrusion line for sensing the rate of delivery of extruded product from the associated extrusion line and for delivering an individual extrusion rate signal representative thereof;
   means for controlling the molten material delivery rate of said material supply means to maintain the total production rate of extruded product, as represented by the sum of said individual extrusion rate signals, at a preselected value;
   pressure measurement means for sensing the pressure of said molten material provided by said material supply means and delivering a source pressure signal representative thereof;
   means for generating a plurality of preliminary valve position set point signals, one associated with each said valve means, said plurality of preliminary valve position set point signals representing the positions of their respective associated flow control valves required to maintain said source pressure signal at a preselected value;
   means for generating, in response to said individual extrusion rate signals, a plurality of valve position set point adjustment signals, one associated with each said valve means, each said valve position set point adjustment signal being representative of the change in the position of its associated valve means necessary to provide a preselected relationship among said individual extrusion rate signals;
   means for combining the preliminary valve position set point signal and the valve position set point adjustment signal associated with each said valve means to provide a plurality of adjusted valve position set point signals; and
   means for positioning each said valve means to provide a valve position represented by its respective adjusted valve position set point signal.

15. Apparatus in accordance with claim 14 wherein each said extrusion line is adapted to produce an extruded product of substantially the same dimension at substantially the same extrusion rate.

16. Apparatus in accordance with claim 15 wherein said means for positioning each said valve means comprises means for maintaining said associated valve position set point signal within a preselected range of a valve position feedback signal representative of the actual position of said associated valve means.

17. Apparatus in accordance with claim 14 wherein there are two said extrusion lines.

18. Apparatus in accordance with claim 14 wherein each said extrusion line is adapted to produce an extruded product at substantially the same extrusion rate.

19. Apparatus in accordance with claim 18 wherein said means for generating said plurality of preliminary valve position set point signals comprises proportional-integral-derivative controller means for generating a pressure control output signal suitable for use as a preliminary valve position set point signal for each said valve means.

20. Apparatus in accordance with claim 19 wherein there are two said extrusion lines.

21. Apparatus in accordance with claim 20 wherein said means for generating said plurality of valve position set point adjustment signals comprises means for producing said value position set point adjustment signals of substantially magnitude and opposite sign.

22. Apparatus in accordance with claim 21 wherein said means for positioning each said valve means comprises means for maintaining said associated valve position set point signal within a preselected range of a valve position feedback signal representative of the actual position of said associated valve means.

23. Apparatus in accordance with claim 22 wherein said production rate measurement means comprises means for measuring the product extrusion speed of the associated extrusion line.

* * * * *

UNITED STATES PATENT AND TRADEMARK OFFICE
CERTIFICATE OF CORRECTION

PATENT NO. : 4,107,246
DATED : August 15, 1978
INVENTOR(S) : Ronald J. LaSpisa

It is certified that error appears in the above-identified patent and that said Letters Patent are hereby corrected as shown below:

Column 16, line 37, claim 21, after "substantially" and before "magnitude" insert -- equal -- .

Signed and Sealed this

*Eleventh* Day of *September 1979*

[SEAL]

*Attest:*

LUTRELLE F. PARKER
*Attesting Officer    Acting Commissioner of Patents and Trademarks*